United States Patent [19]
Diepold et al.

[11] Patent Number: 5,142,982
[45] Date of Patent: Sep. 1, 1992

[54] IGNITION DEVICE

[75] Inventors: Gisela Diepold, Hechendorf; Bernhard Vetter, Bruckmühl; Karl Unterforsthuber, Oberhaching, all of Fed. Rep. of Germany

[73] Assignee: Bayern-Chemie Gesellschaft fur flugchemische Antriebe mbH, Fed. Rep. of Germany

[21] Appl. No.: 645,696

[22] Filed: Jan. 25, 1991

[30] Foreign Application Priority Data

Jan. 25, 1990 [DE] Fed. Rep. of Germany ....... 4002088

[51] Int. Cl.$^5$ ......................... F42C 19/08; F42C 19/12
[52] U.S. Cl. .............................. 102/202.5; 102/202.14; 102/530
[58] Field of Search .................. 102/202, 202.5, 202.9, 102/202.14, 472, 530, 531

[56] References Cited

U.S. PATENT DOCUMENTS 4,621,578 11/1986 Vallieres et al. ................ 102/202.9
4,959,011 9/1990 Nilsson ............................ 102/202.5

FOREIGN PATENT DOCUMENTS 168588 1/1986 European Pat. Off. ............ 102/531
3032338 3/1981 Fed. Rep. of Germany .
3505937 8/1986 Fed. Rep. of Germany ... 102/202.5
3338929 8/1987 Fed. Rep. of Germany .
3615236 11/1987 Fed. Rep. of Germany .

Primary Examiner—Charles T. Jordan
Attorney, Agent, or Firm—Evenson, Wands, Edwards, Lenahan & McKeown

[57] ABSTRACT

For the purpose of reducing manufacturing costs and mounting defects, an electric ignition device has a one-piece basic body as a base for a primary and a secondary charge, so that the tightness is also increased with respect to moisture penetration.

17 Claims, 2 Drawing Sheets

IGNITION DEVICE

BACKGROUND AND SUMMARY OF THE INVENTION

The present invention relates to an ignition device having an electrically ignitible primary charge which is arranged on a rotationally symmetrical basic body and, more particularly, to an ignition device which is enclosed by a sealing cylindrical sleeve and a cap, in which the space remaining between the cap and a tamping sleeve fastened to the ignition device concentrically to the cap is filled with a secondary igniting substance.

German Patent DE 37 38 436 C1 shows an electric ignition device which comprises a basic body on which a primer capsule is arranged. The primary igniting substance surrounding the primer capsule is surrounded by a sealing sleeve which, in turn, is enclosed by a jacket. The jacket comprises two parts which can be fitted into one another so that, when the ignition device is mounted, the basic body, via a sealing ring, can be form-lockingly inserted into the interior space formed by the two jacket parts This ignition device has proven itself under operating conditions, but also has disadvantages. Since the base of the ignition device comprises three parts and an additional sealing ring, this results in considerable expenditures during manufacturing and also during the mounting of the parts which are to be fitted into one another. In addition, there is the problem of leakiness with respect to the moisture entering along the joint faces of the parts, particularly if individual parts have been inaccurately adjusted with respect to one another during the mounting.

It is therefore an object of the present invention to further develop an ignition device such that the above-mentioned disadvantages are avoided.

This object has been achieved according to the present invention in a surprisingly simple manner by constructing the body in one piece with a control bore for receiving electric connections of the primer capsule. The body, at a primary-charge-side end of bore, has a receiving arrangement for the base of the primer capsule and a projection for fastening a cap. The basic body has fastening devices on its circumference and an arrangement for fastening of a tamping sleeve.

A principal advantage of the present invention is that, because the base consists only of the basic body, a considerable reduction of the manufacturing and mounting costs is achieved and the previously occurring sealing problems are largely avoided.

BRIEF DESCRIPTION OF THE DRAWINGS

These and other objects, features and advantages of the present invention will become more apparent from the following detailed description of presently preferred embodiments when taken in conjunction with the accompanying Figure, which is a schematically simplified sectional view of an ignition device for an airbag gas generator.

DETAILED DESCRIPTION OF THE DRAWINGS

Figure 1:
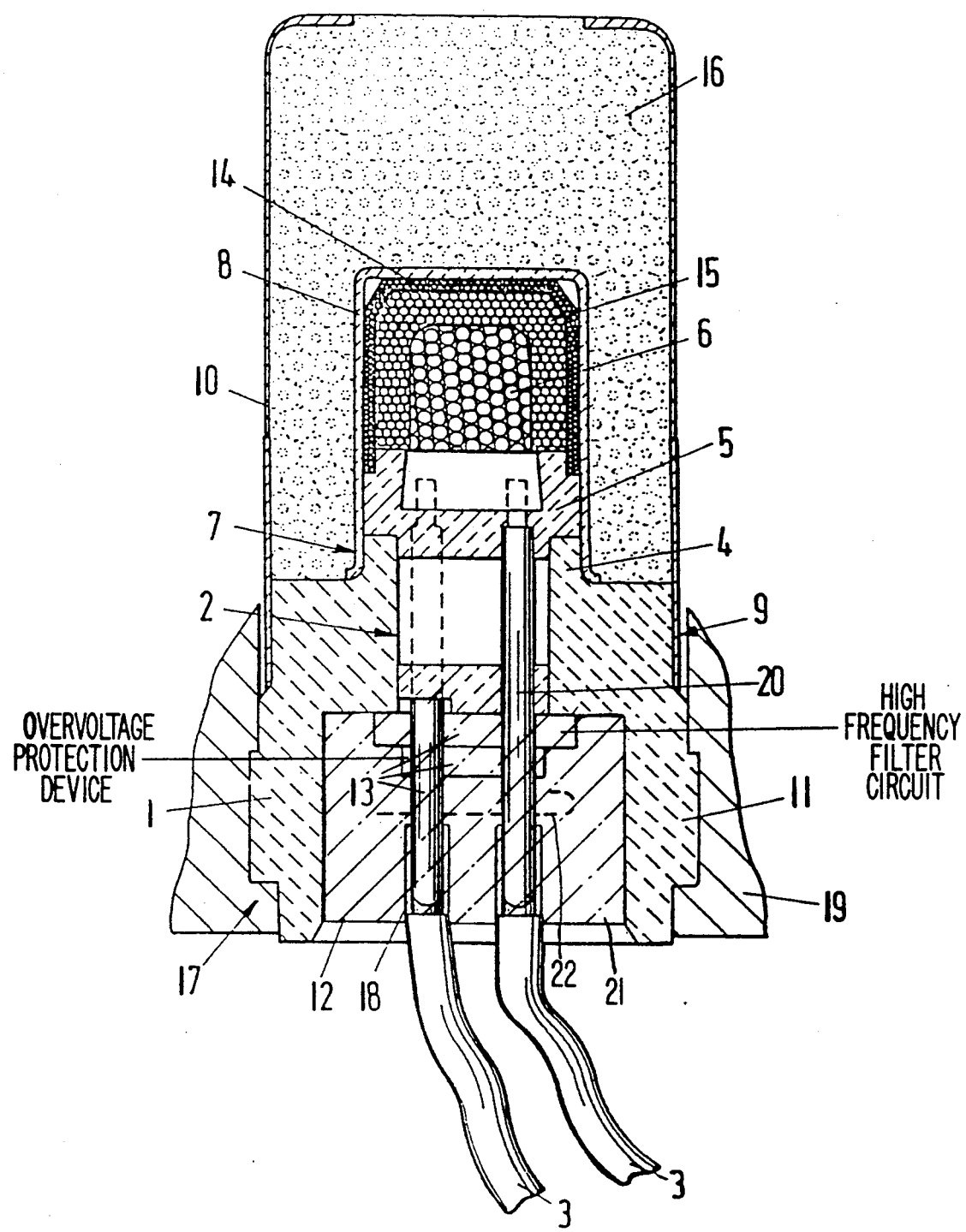
Figure 2:
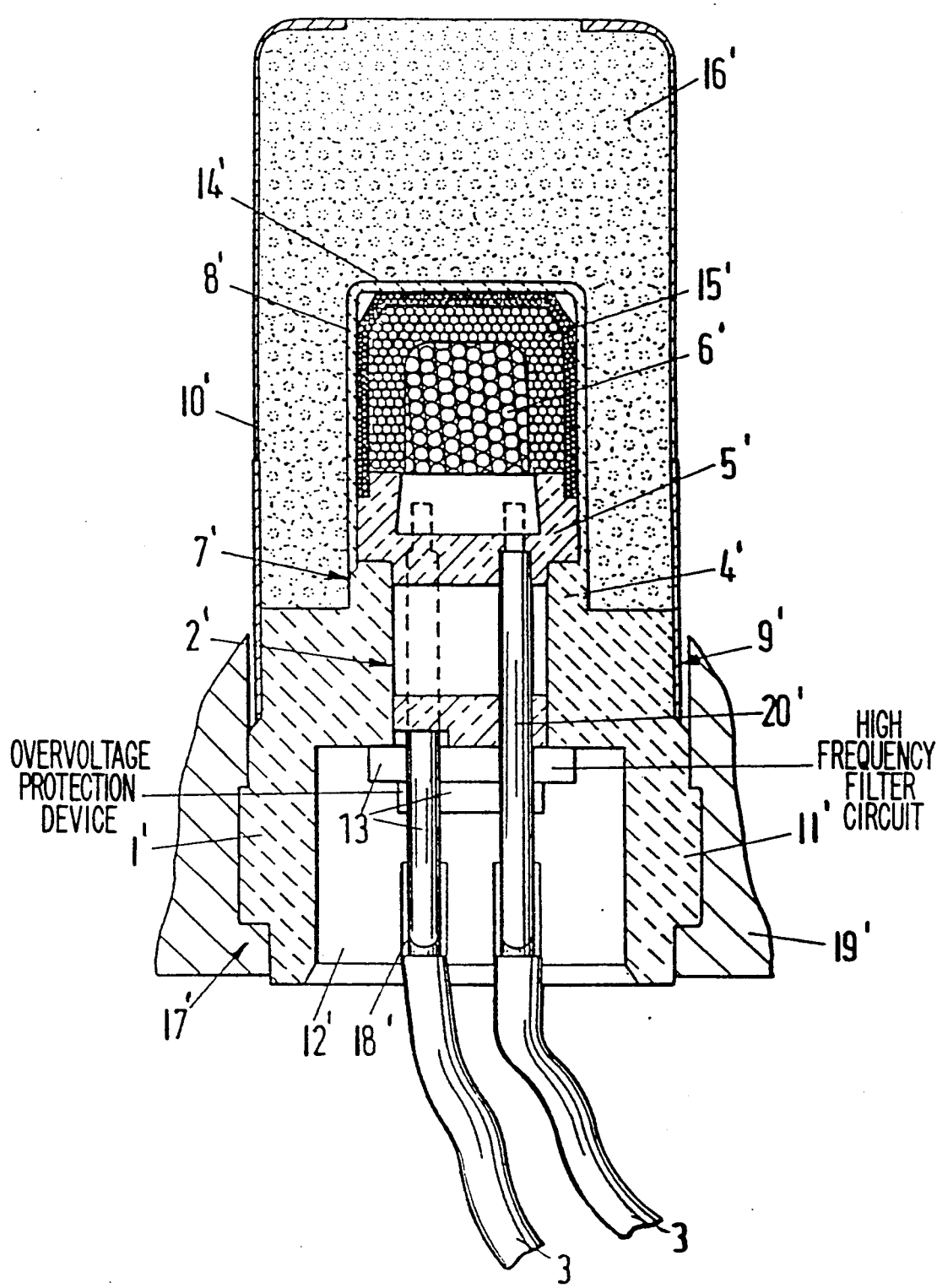
FIG. 2 is a view similar to FIG. 1 but showing the basic body and cap formed in once piece.

A rotationally symmetrical basic body 1 which, if required, may be manufactured from an electrically conductive material, such as metal, or an insulator, such as a ceramic material, has an axial bore 2. On one side of the bore 2, a receiving arrangement 4 is provided for the base 5 of a primer capsule 6 consisting of an insulating body. The primer capsule in the illustrated embodiment is configured as a projection which form-lockingly corresponds with a recess in the base 5. The outer side of the projection 4 is used at the same time for fastening a cap 8 enclosing the primary charge 6, 15, constituting part of the primary charge. This cap may be connected with the basic body by soldering, welding, pressing-on, and the like. It is also possible to manufacture the cap 8 and the basic body 1 in one piece as shown in FIG. 2 where like parts are designated by the same numerals used in FIG. 1 but primed. Inside the cap 8, the sleeve 14 constituting part of the primary change is arranged to form the space at the base 5 provided for the primary ignition substance 15.

The basic body 1 also has an arrangement 9 for fastening and sealing off of a tamping sleeve 10 which surrounds the cap 8 at a certain distance. The resulting hollow space is filled with a secondary ignition substance 16.

A fastening device 11 is arranged at the circumference of the basic body for holding the ignition device in a gas generator housing 19. In the illustrated embodiment the fastening device 11 is a surrounding ring which engages in a groove in the housing and is secured by a flange 17.

The electric connections 20 of the primer capsule 6 are guided in an insulated manner (glass, plastic) through the bore 2, where they are fastened and sealed. The connections 20 extend into the space 12 which in the embodiment constitutes a widening of the bore 2 and is radially surrounded by the basic body 1. All electrical operating elements 13 are arranged in this space 12 and must be installed as closely as possible to the primer capsule 6 in order to, for example, keep the influence of external electromagnetic radiation as low as possible. For this purpose, the connecting elements 18 are part of the connecting cables 3 of the ignition circuit (not shown). In addition, the operating elements 13 may comprise a high-frequency filter circuit which is directly connected with the connections 20.

It is also equally possible to provide an overvoltage protection device, such as a discharger for the discharging of static tensions which is aimed from each connection 20 at the basic body 1 consisting of metal. Likewise, the space 12 may be used for receiving a short-circuiting spring 22. If the space 12 is not utilized for the installation of a short-circuiting spring, it may be filled with a casting compound 21.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. An ignition device comprising an electrically ignitable primary charge operatively arranged on a rotationally symmetrical basic body, a sealing cylindrical sleeve and a cap enclosing the primary charge, and a tamping sleeve operatively fastened to the device concentrically to the cap so as to define space filled with a secondary igniting substance, wherein the basic body is configured in one piece with a central bore for receiving electric connections of a primer capsule, and, at a primary-charge-side end of the bore, has a receiving arrangement for a base of the primer capsule and a projection for fastening the cap thereto, and the basic body further having an arrangement for fastening of the tamping sleeve and an integral surrounding ring on a circumference thereof configured to be tightly secured in a mating recess located completely within a housing.

2. The ignition device according to claim 1, wherein a space for accommodating electric operating elements is arranged on a connection-side end of the bore.

3. The ignition device according to claim 2, wherein the electric operating elements contain electric connections to an ignition circuit.

4. The ignition device according to claim 2, wherein the electric operating elements contain a filter circuit.

5. The ignition device according to claim 2, wherein the electric operating elements have an overvoltage protection arrangement.

6. The ignition device according to claim 2, wherein the space is used for receiving a short-circuiting spring.

7. The ignition device according to claim 2, wherein the space is filled with a casting compound.

8. The ignition device according to claim 1, wherein the basic body consists of an electrically conductive material.

9. The ignition device according to claim 1, wherein the basic body consists of an insulator.

10. The ignition device according to claim 1, wherein the basic body and the cap are one piece.

11. The ignition device according to claim 8, wherein a space for accommodating electric operating elements is arranged on a connection-side end of the bore.

12. The ignition device according to claim 9, wherein a space for accommodating electric operating elements is arranged on a connection-side end of the bore.

13. The ignition device according to claim 10, wherein a space for accommodating electric operating elements is arranged on a connection-side end of the bore.

14. The ignition device according to claim 13, wherein the space is used for receiving a short-circuiting spring.

15. The ignition device according to claim 13, wherein the space is filled with a casting compound.

16. The ignition device according to claim 13, wherein the basic body consists of an electrically conductive material.

17. The ignition device according to claim 13, wherein the basic body consists of an insulator.

* * * * *